Sept. 29, 1959 S. X. CASACCI 2,906,571
THRUST BEARING CONSTRUCTION FOR ROTATABLE SPINDLES AND THE LIKE
Filed Oct. 12, 1954 4 Sheets-Sheet 1

INVENTOR
SEVERIN XAVIER CASACCI

BY George H. Carey

ATTORNEY

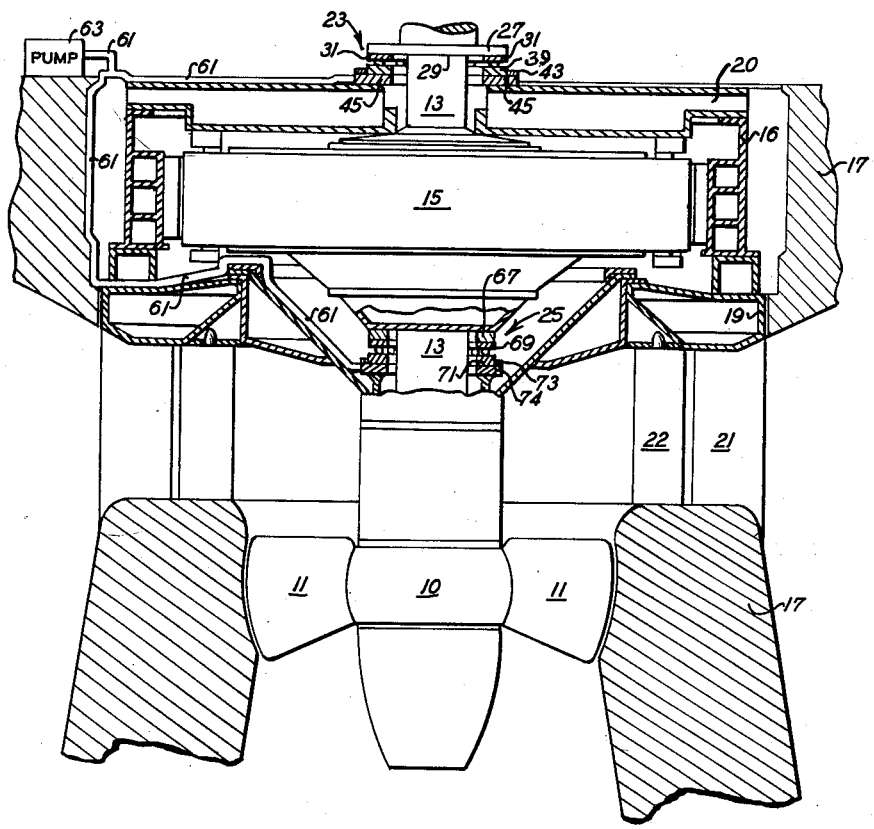
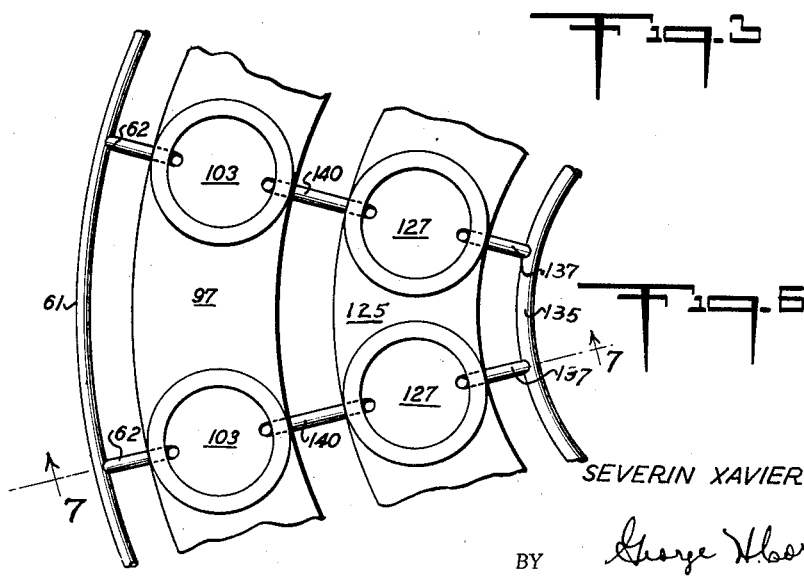

Sept. 29, 1959 S. X. CASACCI 2,906,571
THRUST BEARING CONSTRUCTION FOR ROTATABLE SPINDLES AND THE LIKE
Filed Oct. 12, 1954 4 Sheets-Sheet 3

INVENTOR
SEVERIN XAVIER CASACCI
BY George H. Corey
ATTORNEY

Sept. 29, 1959  S. X. CASACCI  2,906,571
THRUST BEARING CONSTRUCTION FOR ROTATABLE SPINDLES AND THE LIKE
Filed Oct. 12, 1954  4 Sheets-Sheet 4

INVENTOR.
SEVERIN XAVIER CASACCI
BY
*George H. Borey*
ATTORNEY

United States Patent Office 2,906,571
Patented Sept. 29, 1959

2,906,571

THRUST BEARING CONSTRUCTION FOR ROTATABLE SPINDLES AND THE LIKE

Severin Xavier Casacci, Grenoble, France, assignor to Etablissements Neyrpic, Grenoble, France, a corporation of France Application October 12, 1954, Serial No. 461,897

Claims priority, application France April 10, 1954

6 Claims. (Cl. 308—160)

This invention relates to thrust bearing constructions and more especially to thrust bearing constructions for prime movers having a rotor developing thrust in the direction parallel to the axis of rotation. The invention particularly relates to hydraulic turbine units in which the runner or rotor is rotatable on a vertical axis.

In machines of the type referred to above, it is recognized that it would be desirable to provide a plurality of thrust bearings in order that adequate bearing surface may be provided to support the total thrust and so that this thrust may be distributed upon these bearings. In prime movers for large power, for example, and particularly in prime movers having a heavy rotor rotatable on a vertical axis, the thrust bearing is required to provide a large bearing surface in order to bear the force of the thrust and the weight of the rotatable rotor. Division of the bearing surface of the thrust bearing into two or more thrust bearings would make possible reduction of the diameter of the thrust bearings and, therefore, of the space occupied thereby and reduction of the width of the individual thrust bearing surfaces would facilitate manufacture as well as diminish the degree of deformation of the members providing these surfaces under load and during operation.

It has been found, however, that such desirable division of the thrust bearing surface into a plurality of thrust bearings, and especially into two or more thrust bearings spaced along the axis of a spindle or shaft, involves considerable hazard in the operation of the machine. Such hazard develops from the fact that changes of temperature of the rotating parts as well as of the stationary parts of the machine and in some cases variations in the forces due to the load or distortions of the supporting foundation or framework cause non-uniform bearing of the rotatable thrust elements that are intended for bearing engagement with a plurality of fixed thrust supporting members of the machine. When two thrust bearings, for example, are disposed in spaced relation to each other along the axis of rotation of a rotatable member or spindle, expansion or contraction of the member or of the spindle lengthwise of the axis will bring one of the thrust bearing elements in engagement with its thrust supporting member while moving the other thrust bearing element axially away from its thrust supporting member. It is clear that such action will tend to transfer to the first bearing all of the thrust and of the load which acts parallel to the axis of rotation. It is generally the practice, therefore, so to design the thrust bearing for such machines that as a single bearing it is capable of taking the total thrust and, if a vertical machine, all of the weight of the rotor as well.

It is an object of the invention to meet the conditions referred to which arise in connection with a machine, such as a vertical turbo-generator, while providing two or more thrust bearings so as to secure the advantages referred to above.

It is a further object of the invention to provide in a multiple thrust bearing machine for maintaining the rotatable thrust bearing elements in bearing relation upon the corresponding thrust supporting members so that each of the thrust bearings of the plurality of said thrust bearings disposed in spaced relation to each other shall take its proper share of the total thrust load and so that this load is properly distributed between the bearings.

It is a feature of the invention that the thrust supporting members which are engaged by the thrust bearing elements that are carried by the rotatable member or spindle and rotate therewith are supported for movement in the direction generally parallel to the thrust or transversely of the thrust bearing surfaces of the thrust supporting members and of the thrust bearing elements which are in engagement with each other. Means are provided for effecting such movement of the thrust supporting members when, under a variation of the thrust during operation, movement of one of the thrust supporting members occurs so as to move the bearing surface of the other supporting member toward or away from its thrust bearing element to bring greater and less pressure upon the surface of the corresponding thrust bearing element. The pressures applied to the thrust-bearing elements by the thrust supporting members thus may be equalized or may be in a predetermined relation to each other.

Preferably the means utilized in the invention for applying the pressure upon the thrust supporting members to press them in engagement with the respective thrust bearing elements includes fluid pressure cushions associated respectively with and capable of applying to the thrust supporting members forces which may be equal, if the areas to which the fluid pressure is applied in the respective members are equal, or may be determined in other relation by making the areas of respective thrust supporting members to which the fluid pressure is applied in the desired proportions. The fluid pressure cushions associated with the respective thrust supporting members are connected together by conduit means through which the fluid may move to and fro according as the force of the thrust applied to the respective thrust supporting members by the thrust bearing elements is greater and less. If the force applied to one thrust supporting member is substantially increased, fluid is forced from the fluid pressure chamber which supports this thrust supporting member toward the chamber of the other thrust supporting member until equilibrium and the desired distribution of the thrusts is secured.

Other characteristics and advantages of the invention will be understood from the description to follow of embodiments of the invention given as examples, this description being taken in connection with the drawings in which:

Fig. 3 shows in vertical section a turbo-alternator unit embodying the thrust bearing construction of the invention.

Fig. 6 shows another embodiment of the invention.

Figure 1:
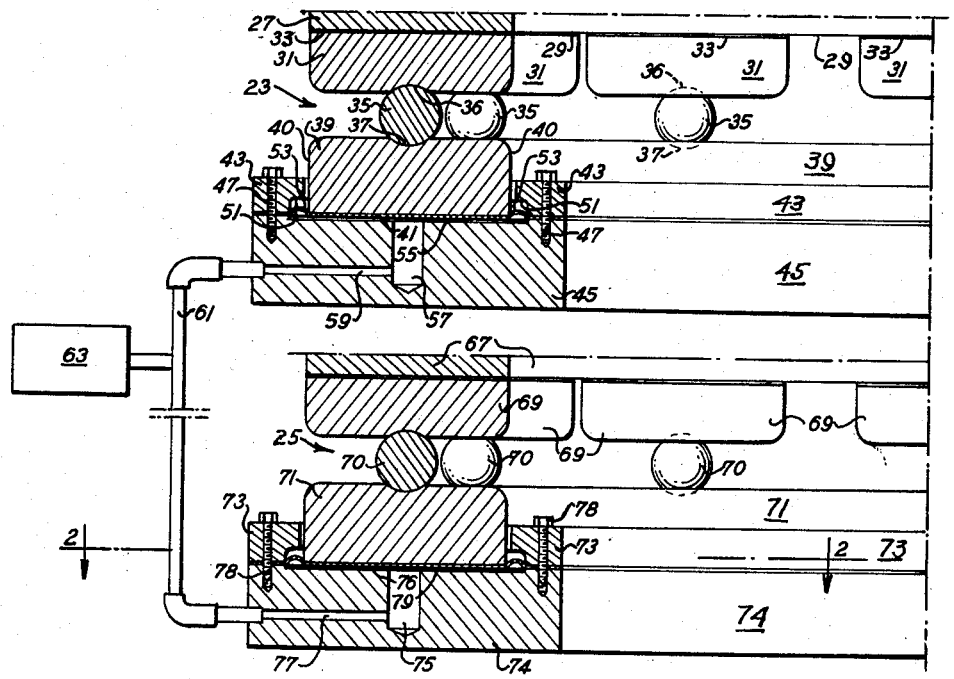
Fig. 1 is a partial radial section of two thrust bearings cooperating in accordance with the invention.
Figure 2:
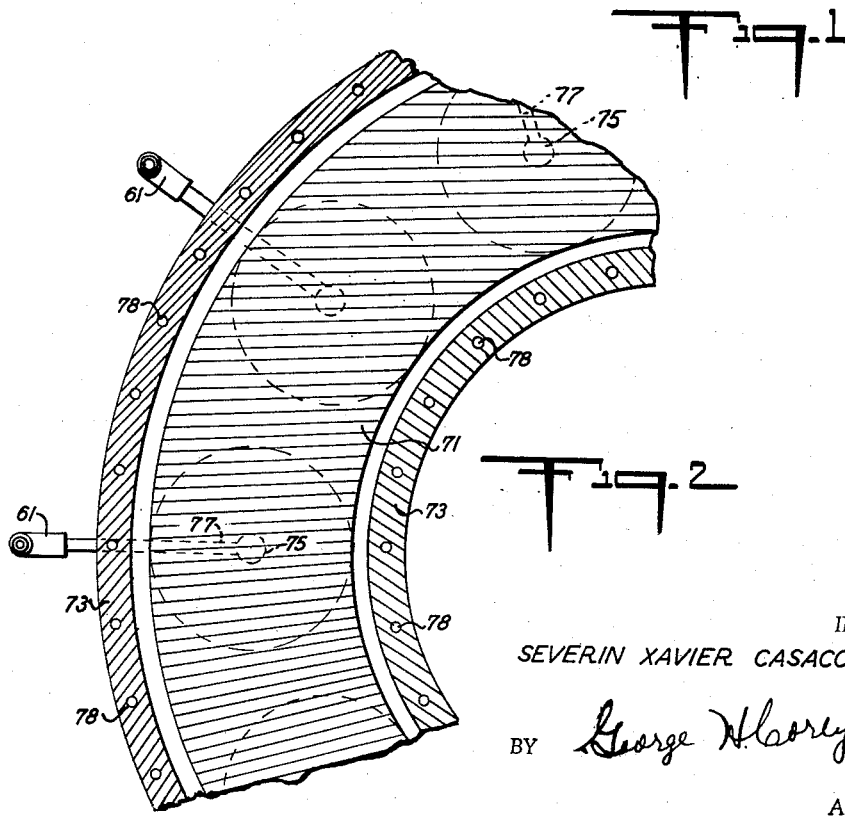
Fig. 2 is a partially transverse section taken on line 2—2 of Fig. 1.

The form of the invention shown in Figs. 1 and 2 will be understood by having reference also to Fig. 3 in which more or less diagrammatically the thrust bearing construction shown in Figs. 1 and 2 is embodied in a vertical turbo-generator unit having a rotatable runner 10 carrying turbine blades 11, this runner being mounted on the vertical spindle 13 which also carries the rotor 15 of the generator the stator structure 16 of which is supported on foundation 17 which also carries supports 19 and 20 for the thrust bearings as well as supporting the distributor vanes 21, 22.

In contrast to the usual arrangement in which the rotatable member of the turbo-generator is supported by a single thrust bearing, as shown in Fig. 3 two thrust bearings are provided in accordance with the invention to support the spindle 13 of the unit carrying the runner 10 and the rotor 15. One of the thrust bearings shown generally at 23 is disposed at the upper part of spindle 13 above the rotor 15. The other thrust bearing indicated generally at 25 is disposed between the runner 10 and the rotor 15. The thrust bearing constructions provided in bearings 23 and 25 and to be described more particularly in connection with Figs. 1 and 2 and carried by the supports 19, 20 are supported on the foundation 17.

In the ordinary turbo-alternator, if two thrust bearings are to be disposed at either side of the rotor of the generator, they must be spaced at a considerable distance along the spindle. It will be understood that changes in the length of the spindle due to temperature or other forces may bring upon one or the other of such thrust bearings an excessive load. In the extreme case the change of dimension of the spindle along its axis may be such that one or the other of the rotatable elements of these thrust bearings becomes removed from proper bearing engagement with the corresponding stationary member of the respective thrust bearing. The reduction of diameter and of width of the bearing surfaces which is made possible by the provision of two thrust bearings as compared with a single thrust bearing then becomes a serious disadvantage because one bearing is inadequate since all of the thrust load will be carried by a single bearing of insufficient bearing surface. In order to meet this condition while securing the advantages of two thrust bearings spaced axially along the spindle of the turbo-generator, the thrust bearings may be so constructed and may be interconnected, as about to be described in connection with Figs. 1 and 2, so as to dispose the thrust supporting members of the two thrust bearings in proper relation to the rotatable elements of these bearings under all conditions of temperature and load which otherwise may develop unequal bearing or non-uniform distribution of the thrust load between the two bearings.

As shown in Figs. 1, 2 and 3, the upper thrust bearing may comprise an annular rotatable thrust bearing element 27 carried on the spindle 13 for rotation therewith. This rotatable thrust bearing element in the embodiment being described provides an annular lower surface 29 perpendicular to the vertical axis of the spindle 13. Shoes 31 providing upper horizontal surfaces 33 are supported beneath the element 27, a plurality of these shoes being disposed in spaced relation to each other peripherally about the axis of spindle 13. The thrust due to the turbine blades 11 when rotating and the weight of the rotatable parts including the runner, spindle and rotor that is transmitted through the annular thrust bearing element 27 is divided between the shoes 31 so as to distribute this load circumferentially about the axis.

In the embodiment of Figs. 1 and 2, the shoes 31 are supported on balls 35 engaging the shoes 31 in recesses 36 at the underside thereof. These balls also engage in recesses 37 provided in an annular member 39 which is disposed co-axially with the axis of the spindle 13. Thus, the thrust is transmitted from the rotatable thrust element 27 through the individual shoes 31 and through balls 35 to the annular member 39.

The annular member 39 in the embodiment of Figs. 1 and 2 is supported by a hydraulic cushion which comprises a diaphragm 41 of annular form disposed beneath and in engagement with the under surface of the annular member 39. This diaphragm 41 is of such width as to provide marginal portions thereof extending beyond the annulus of the member 39 so that these marginal portions may be clamped between rings 43 which are coaxial with the annular member 39 and respectively extend therealong and along annular base 45 which, as shown in Fig. 3, may be supported on the support 20. The annular rings 43 are fastened to the base 45 by bolts 47 peripherally distributed, as shown in Fig. 2 for bolts 78, along the rings 43 and the annular member 39.

As shown in Fig. 1 the rings 43 each are provided with an annular recess 51 at the underside thereof and adjacent the marginal portions of the diaphragm 41. These recesses provide for upward bulging at 53 of these marginal portions of the diaphragm when a fluid pressure is exerted at the underside of the diaphragm 41, thus providing for vertical movement of the annular member 39 concomitantly with flexing of the diaphragm in these marginal portions between the annular rings which clamp the diaphragm against the base 45 and the cylindrical side surfaces 40 of the annular member 39. As shown in Fig. 1, the width of the space between the outer and inner rings 43 adjacent the side surfaces 40 of the annular member 39 is such as to provide clearance between these rings and the annular member for the upward and downward movement of this annular member, thereby to bring the shoes 31 supported on the member 39 into engagement with the rotatable thrust bearing element 27 or to move these shoes away from this thrust bearing element. As shown in Fig. 1, the surface 29 is slightly spaced from the surfaces 33 by an amount which may represent the thickness of an oil film for lubrication of these surfaces.

For effecting the flexing of the diaphragm 41 and concomitant vertical movement and support of the annular member 39 a chamber 55 is provided at the upper face of the base 45 beneath the diaphragm by forming a recess of relatively shallow depth in this face of the base 45 which may be filled with a fluid pressure medium, preferably an hydraulic fluid. The depth of the chamber 55 is merely sufficient to provide for spreading the fluid fully over the area of the diaphragm between the clamping rings 43, and to provide a limited volume in the chamber 55 having regard to the requisite vertical movement of the annular member 39 above referred to which occurs concomitantly with the flexing of the diaphragm 41.

In the base 45 a central space 57 is provided communicating with the chamber 55, this space 57 being connected by the passage 59 with a fluid pressure piping system 61. Also connected to this piping system is a pump 63 or other suitable source of fluid pressure. Pressure may be maintained constant by any suitable means in the piping system 61 and in the space 57 and the chamber 55.

As shown at the lower part of Fig. 1, a second thrust bearing construction 25 of the same construction as bearing 23 shown in the upper part of Fig. 1 and above described is provided, this second thrust bearing construction being shown also in Fig. 3 at 25. The respective parts of construction 25 will be readily recognized, including the rotatable thrust bearing element 67, the shoes 69, balls 70, and the annular member 71, together with the clamping rings 73 secured to the base 74 by bolts 78. The base 74 of this construction provides space 75 connected by the passage 77 to the piping system 61 so that beneath the diaphragm 76 of the construction 25 the fluid pressure of the source 63 is applied in chamber 79 simultaneously with application of this pressure to the diaphragm 41.

It will be understood that such application of pressure beneath the diaphragms 41 and 76 will be effective to move the shoes 31, 69 into bearing relation respectively with the annular thrust bearing elements 27 and 67. Such engagement of the respective surfaces of the two thrust bearings may be accomplished when the turbo-generator unit is stopped and when the spindle 13 has not yet become heated due to the operation of the machine and therefore subjected to an expansion of its length. On the other hand, this engagement of the thrust supporting shoes 31, 69 with the respective rotatable thrust bearing elements 27, 67, may be effected when the machine is not yet subjected to the cooling action of the water or hydraulic fluid passing and effecting rotation of the blades on runner 10. Expansion of the spindle 13 under heat will tend to move the upper rotatable thrust bearing element 27 upwardly from the supporting shoes 31, thus transferring the total thrust to the lower bearing construction 25. On the other hand, contraction of the spindle 13 on cooling will tend to lift the lower rotatable thrust bearing element 67 from the shoes 69, thereby transferring the total thrust load to the upper thrust bearing 23.

When under such expansion or contraction of the spindle or for some other reason, a greater or less pressure is brought upon one or the other of the thrust bearing shoes 31, 69, which pressure is transferred through the structure described to the diaphragms 41, 76, an excess pressure is developed in one of the chambers 55, 79 which forces a portion of the fluid out of such chamber through the piping system 61 and into the other chamber, thereby to bring a greater or less pressure beneath the diaphragm of this other chamber. An increase of the load, for example, on rotatable element 27 will increase the pressure in the chamber 55 and force fluid therefrom into the chamber 79, thereby to bring an increased pressure of the shoes 69 on the rotatable element 67. The load of the thrust then is distributed between the two thrust bearings which are spaced along the axis of rotation and the condition that one or the other of the thrust bearings so disposed tends to receive an excess of load or pressure is avoided. If the pressure developed by the source 63 in the piping system 61 is controlled to an amount sufficient to support the thrust load due to the weight of the rotatable parts as well as the thrust due to the runner 10, any variation in the thrust bearing load on the respective bearings is equalized or distributed by the movement of the fluid through the piping system as above described.

It will be understood that, although in the embodiment of Figs. 1 and 2 the annular members 39, 71 are shown as of substantially the same dimension and the pressures of the fluid upon the diaphragms supporting these annular members may be substantially equal, nevertheless, if desired, the widths of the respective annular members 39, 71 or the extent of the annulus about the axis of rotation, or both these dimensions, may be different in the two annular members 39, 71, so that a greater or a less total pressure for a given fluid pressure is exerted upon one or the other of the diaphragms and, therefore, the force supporting the respective shoes in the bearings 23 and 25 may be different. It will be understood, however, that any variation of the load carried by one or the other of the bearings 23, 25 will be distributed by virtue of the fluid pressure action in the proper proportion as determined by the areas of the diaphragms 41, 76, so that each bearing will provide a supporting force bringing the shoes 31 and 69 into contact with the respective rotatable elements 27 and 67 in the desired proportions. The hazards above referred to of improper distribution of the loads on the two thrust bearings thus are obviated by the fluid pressure cushions which are provided by the bearing construction of the invention.

Figure 4:
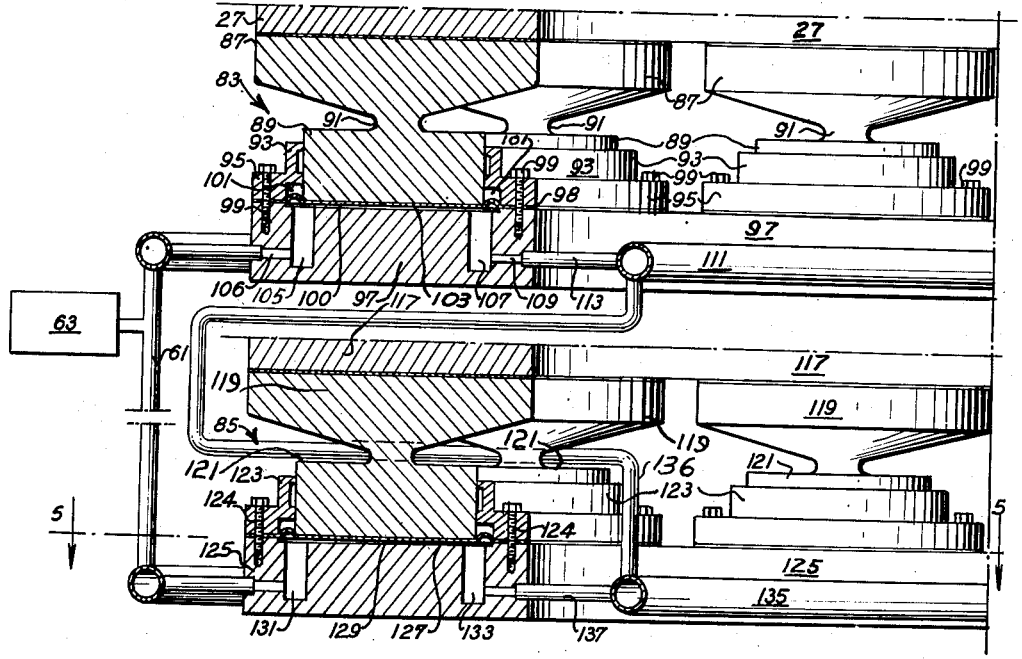
Fig. 4 is a partial radial section of two thrust bearings of modified form cooperating in accordance with the invention.
Figure 5:
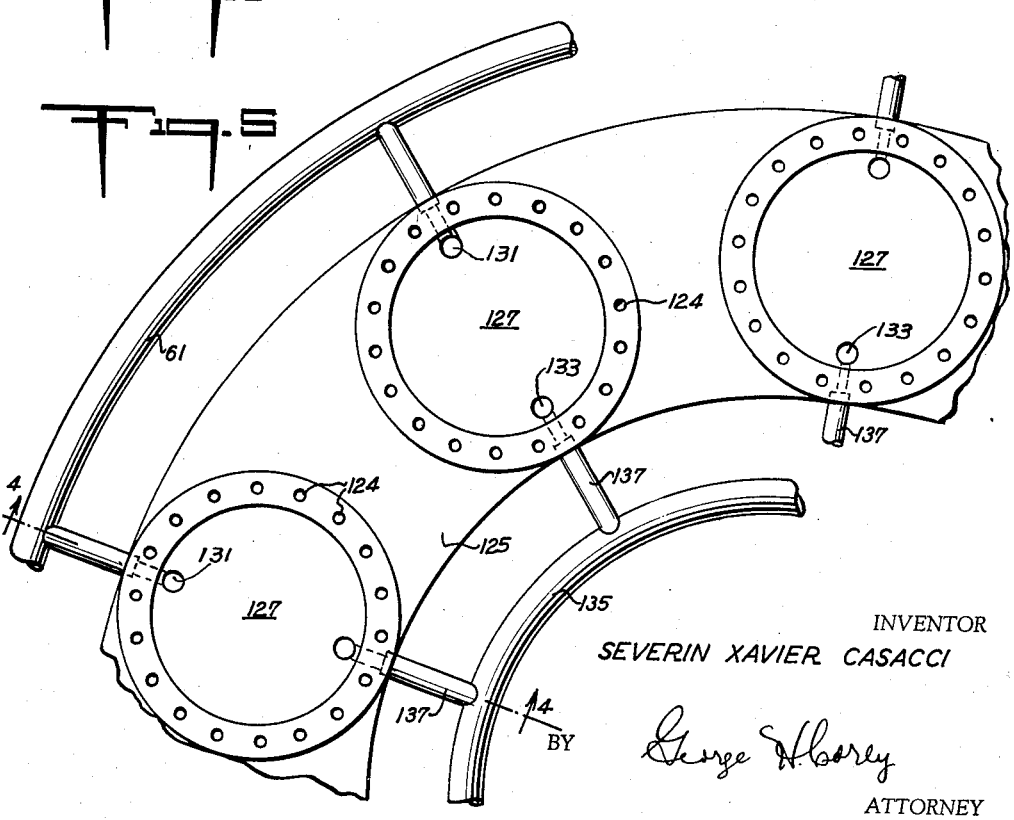
Fig. 5 is a partial transverse section taken on line 5—5 of Fig. 4.

The embodiment of the invention shown in Figs. 4 and 5 also is capable of securing equalization or proportioning of the loads carried by the respective thrust bearings which are axially spaced along the axis of rotation similarly to bearing 23, 25 of Figs. 1, 2 and 3. In Fig. 4 the upper bearing 83 cooperates with the lower bearing 85 by virtue of the fluid pressure system 61 supplied by fluid pressure source 63 functioning as described in Figs. 1 to 3 inclusive. In Fig. 4 the upper rotatable thrust bearing element 27 bears upon a plurality of pads 87 disposed in spaced relation to each other peripherally about the axis of rotation of the spindle of the unit. Each of the pads 87 is supported on a cylindrical supporting member 89 connected to the pads by a short column 91 which also may be of circular cross-section. Within the scope of the invention the parts 87, 89, 91 may be formed in one piece or, if desired, may be provided as separate pieces suitably joined together to form a movable supporting member capable of receiving the thrust applied thereto by the rotatable thrust element 27.

Similarly to the construction of Figs. 1 and 2 but individual to the respective thrust supporting members 89, circular rings 93 extend about the cylindrical portions of the supporting members 89 with a slight clearance, so that the members 89 and the pads 87 individually may be moved upwardly and downwardly with respect to the rotatable element 27.

The circular rings 93 are provided with flanges 95 which are secured to a base member 97 of annular form extending about the axis of rotation of the unit by means of bolts 99 extending through these flanges. The rings 93 also serve to clamp between the flanges 95 and the base 97 diaphragms 100 engaging the bottom face of each of the supporting members 89. As shown in Fig. 4, the rings 93 are formed so as to provide recesses 101 between the cylindrical peripheral surfaces of the supporting members 89 and the flanges 95 adjacent the circular diaphragms 100. The recesses 101 provide for a slight bulging of the diaphragms so that the diaphragms may flex concomitantly with the upward and downward movement of the supporting members 89 toward and away from the thrust bearing element 27.

The base 97 at its upper face is recessed to provide a shallow fluid pressure chamber 103 beneath each diaphragm 100 so that, upon forcing fluid under pressure into this chamber, upward movement of the supporting members 89 and of the pads 87 may be effected. Upon withdrawing fluid from the chambers 103 the diaphragms may move downwardly and relieve the upward pressure of the respective pads on the thrust bearing element 27.

Similarly to the arrangements of Figs. 1 and 2, each of the fluid pressure chambers 103 communicates through a space 105 and passage 106 formed in the base 97 with the fluid pressure system 61 supplied by the source 63. In the arrangement of Figs. 4 and 5, however, a second space 107 formed in base 97 also communicates with each chamber 103 and through passage 109 to a second piping system 111. The passages 109 are connected by respective branches 113 to the system 111. It will be understood that upon movement of the fluid pressure medium into or out of one of the chambers 103 upon variation of the pressure exerted upon the fluid in such chamber, this fluid will move through the piping system 111 and connections 113 out of or into the other chambers 103 associated with the thrust supporting members 89. The pressure resisting the thrust of the thrust bearing element 27 and exerted upon the underside of all of the thrust supporting members 89 thereby will be equalized or otherwise distributed in proportion to the areas of the cylindrical portions of the members 89.

In the lower part of Fig. 4 is shown thrust bearing 85 having parts corresponding to those just described in connection with the upper thrust bearing construction 83 in this figure, including the lower rotatable thrust bearing element 117 of the thrust bearing 85 and pads 119 supported by the columns on the respective thrust supporting members 121. With each of these members 121 a ring 123 cooperates in the same manner as the ring 93 above described, this ring being fastened to the annular base member 125 of the bearing 85 by bolts 124. The base member 125 also provides a chamber 127 for each of the thrust supporting members 121 and a diaphragm 129 engaging the lower face of the member 121 and clamped between the flange of the ring 123 and the base member 125.

In the base member 125 space 131 communicates with the chamber 127 and with the piping system 61. Space 133 also provided in the base member 125 communicates with the chamber 127 and with the annular pipe 135 which is connected by one or more pipes 136 to the piping system 111. Similarly to the construction of bearing 83, pipe connections 137 respectively connect the spaces 133 of the base member 125 to the annular pipe 135. The fluid under pressure supplied by source 63 thus may fill all of the chambers 103, 127 and the intercommunicating piping systems.

It will be understood, therefore, that equalization or desired distribution of the fluid pressure is accomplished between the chambers 127 which are disposed in spaced relation to each other about the axis of rotation of the unit through the annular pipe 135 and the connections 137. It will be understood also that through the piping system 61 and the piping system which includes the annular pipes 111 and 135 and the connections 113 and 137, equalization or desired distribution of the pressures between the upper thrust bearing 83 and the lower thrust bearing 85 may be accomplished.

If it is desired that the lower thrust bearing shall support a different amount of thrust than the upper thrust bearing the areas of the circular diaphragms 100 and 129 and correspondingly of the thrust supporting members 89, 121 may be suitably proportioned so that the total fluid pressure exerted upon the respective thrust supporting members 89 and 121 will be in the desired proportions. The equalizing or pressure distributing movement of the fluid will secure the desired application of the force to the thrust supporting members to maintain the proper distribution of the thrust between the two bearings 83 and 85.

Figure 7:
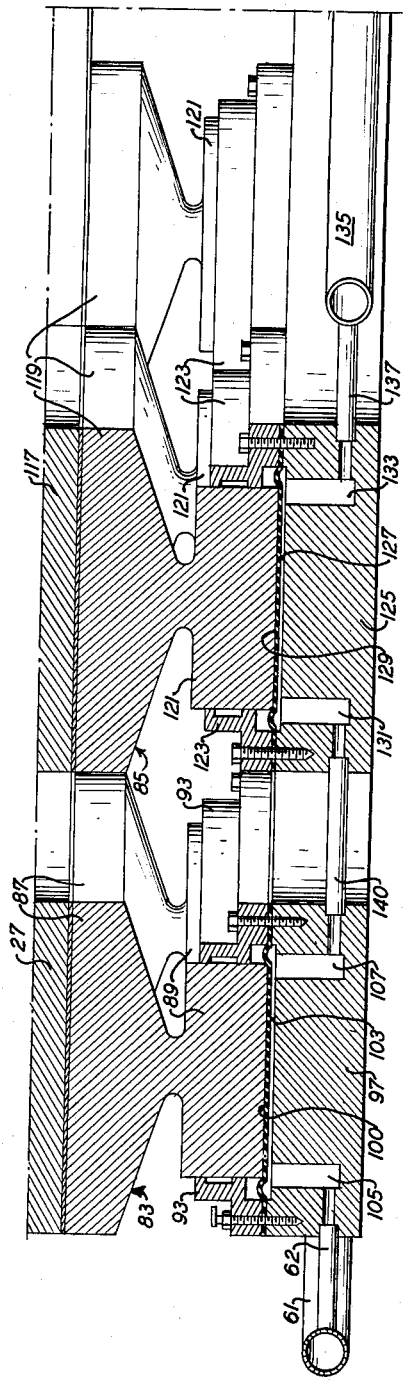
Fig. 7 is a vertical section taken on line 7—7 of Fig. 6.

In the embodiment of Figs. 6 and 7 two concentric rows of bearings are provided. Each row is constructed similarly to the constructions of Figs. 4 and 5, corresponding reference numerals being used. Instead, however, of the two bearings 83 and 85 being spaced along the axis of rotation, these two bearings are in the same horizontal plane, as shown in Fig. 7. The disposition, however, of the thrust supporting members 89 and 121 and of the cooperating chambers 103 and 127 formed at the upper faces of the respective base members 97 and 125 is such that the axis of the chamber 103 and the corresponding thrust supporting member 89 is in the same plane as the axis of the chamber 127 and the corresponding thrust supporting member 121. In accordance with the invention this plane includes also the axis of rotation of the unit.

It will be understood that, although in the construction of Figs. 6 and 7 the two thrust bearings 83, 85 are disposed in concentric relation but spaced transversely of the axis of rotation one outwardly relative to the other rather than spaced along the axis of rotation, nevertheless, consistent with the construction of Figs. 4 and 5, the construction of Figs. 6 and 7 provides two thrust bearing constructions which co-operate with each other to maintain the distribution of the thrust bearing loads between the two bearings. This is accomplished in the same manner as provided in the other embodiments by providing a fluid pressure piping system 61 and its connection 62 to the respective chambers 103 and also providing the piping system 135 and the connection 137 to the respective chambers 127. In addition in the embodiment of Figs. 6 and 7 the outer chambers 103 are connected by the pipe connections 140 to the inner chambers 127, so that equalization or distribution of the pressure between the chamber 103 and chamber 127 may be accomplished in the same manner as described in connection with the other embodiments. An excess of pressure, for example, applied to the thrust supporting members associated with the outer base ring 97 will cause the fluid pressure medium to flow through the pipe connections 140 into the several chambers 127 associated with the base member 125, thereby to increase the fluid pressure upon the thrust supporting members 119 associated with the base member 125 for equalization or proper distribution of the thrust load between the outer and inner rows of bearings.

In the embodiment of Figs. 6 and 7 any such increase of thrust load upon one or the other of the thrust supporting members which unless counteracted may tend to distort the spindle as well as to concentrate the load on such thrust supporting member is offset by movement of the fluid pressure medium into another chamber spaced therefrom outwardly or inwardly and in this embodiment disposed in the same vertical plane which passes through the axis of rotation. The two cooperating thrust supporting members are disposed at the same side of the axis and the increase of pressure in the second chamber increases the bearing pressure on the second thrust supporting member so as to offset the stresses developed by the excess load on the first thrust supporting member.

While the invention has been described more particularly in connection with a vertical hydraulic turbogenerator, it will be understood that it is not limited to turbo-generators or to machines which have a rotatable member rotatable on a vertical axis. The invention may be utilized in machines in which the rotatable member rotates on a horizontal axis, especially where the effects of change of length of the rotating spindle or shaft may produce unequal or improperly distributed thrust bearing loads on the two thrust bearings. The invention, moreover, is not limited to the particular embodiments disclosed and modifications may be made while utilizing the features of the invention by which equalization or the desired distribution of the load between the thrust bearings as above described is secured.

I claim:

1. A thrust bearing construction for a rotatable spindle which comprises a plurality of thrust supporting members arranged in a plurality of sets, the members of each set being disposed outwardly with respect to the axis of said spindle and in spaced relation to each other in the peripheral direction about said axis, said sets being spaced from each other in a given direction transverse to said peripheral direction and being disposed in generally concentric relation to each other upon said axis, each member in a given set being spaced in said given direction relative to a corresponding member in another set that is at the same side of said axis, a plurality of thrust bearing elements carried by said spindle for rotation therewith and respectively associated with said sets and disposed in bearing engagement with the thrust supporting members of the respective sets, means supporting said thrust supporting members for individual movement thereof generally parallel to said axis toward and away from the respective thrust bearing elements, means providing a plurality of fluid pressure cushions respectively cooperating with said thrust supporting members for applying to the respective members pressure opposing the thrust applied to respective thrust supporting members by said thrust bearing elements, plurality of conduits providing fluid pressure communication respectively between the cushion means cooperating with each member in said given set and the cushion means cooperating with the corresponding member in said other set for effecting upon movement of a member of said given set under the thrust of that element which bears thereon movement of the corresponding member of said other set for distributing to said thrust supporting members pressure opposing the thrust applied to said members by said thrust bearing elements, and conduit means providing fluid pressure communication between said cushion means which respectively apply pressure to said members that are peripherally spaced about said axis in said sets.

2. A thrust bearing construction for a rotatable spindle as defined in claim 1 in which each thrust supporting member in said given set is spaced in said given direction along said axis relative to the corresponding member in said other set.

3. A thrust bearing construction for a rotatable spindle as defined in claim 1 in which each thrust supporting member in said given set is spaced in said given direction generally radially with respect to said axis relative to the corresponding member in said other set.

4. A thrust bearing construction for a rotatable spindle as defined in claim 1 in which the bearing surfaces of said thrust bearing elements in bearing engagement with the thrust supporting members of said given set and of said other set are disposed substantially in a common plane perpendicular to the axis of rotation.

5. A thrust bearing construction for a rotatable spindle which comprises a plurality of thrust supporting members arranged in a plurality of sets, the members of each set being disposed outwardly with respect to the axis of said spindle and in spaced relation to each other in the peripheral direction about said axis, said sets being spaced from each other in a given direction transverse to said peripheral direction and being disposed in generally concentric relation to each other upon said axis, each member in a given set being spaced in said given direction relative to a corresponding member in another set that is at the same side of said axis, a plurality of thrust bearing elements carried by said spindle for rotation therewith and respectively associated with said sets and disposed in bearing engagement with the thrust supporting members of the respective sets, means supporting said thrust supporting members for individual movement thereof generally parallel to said axis toward and away from the respective thrust bearing elements, a plurality of walls respectively extending about fluid pressure chambers, pressure responsive elements supported for movement thereof relative to and cooperating with the respective walls to confine fluid pressure in said chambers, means operatively connecting respective pressure responsive elements to said thrust supporting members for effecting movement of said thrust supporting members concomitantly with change in the volume of the respective fluid pressure chambers, conduits connecting the respective fluid pressure chambers associated with said members of said given set with the respective fluid pressure chambers associated with said corresponding members of said other set for effecting upon change in the volume of the fluid pressure chamber associated with a member of said given set change in the volume of the fluid pressure chamber associated with the corresponding member of said other set and concomitant movement of said thrust supporting members in response to change in the relative thrust received by said thrust supporting members, and conduit means providing fluid pressure communication between the fluid pressure chambers respectively associated with said members that are peripherally spaced about said axis in said sets.

6. A thrust bearing construction for a rotatable spindle as defined in claim 5 in which said pressure responsive elements comprise flexible diaphragms respectively extending across and closing said fluid pressure chambers and disposed in engagement with respective thrust supporting members for applying said fluid pressure to said thrust supporting members and for movement of said thrust supporting members concomitantly with flexure of said diaphragms.

References Cited in the file of this patent

UNITED STATES PATENTS

| | | |
|---|---|---|
| 1,169,206 | Sydney | Jan. 25, 1916 |
| 1,409,552 | Kingsbury et al. | Mar. 14, 1922 |
| 1,425,979 | Kingsbury | Aug. 15, 1922 |
| 1,444,840 | Kingsbury et al. | Feb. 13, 1923 |
| 1,706,359 | Lieber | Mar. 19, 1929 |
| 1,937,772 | McCormack | Dec. 5, 1933 |

FOREIGN PATENTS

| | | |
|---|---|---|
| 478,378 | France | Sept. 18, 1915 |
| 29,153 | Norway | Oct. 14, 1918 |
| 330,883 | Germany | Dec. 11, 1919 |
| 341,146 | Germany | Sept. 26, 1921 |
| 487,677 | Germany | Dec. 13, 1929 |